United States Patent
Schiff

(10) Patent No.: US 7,305,842 B1
(45) Date of Patent: Dec. 11, 2007

(54) ENVIRONMENTAL CONTROL SYSTEM AND METHOD FOR AN AIRCRAFT

(76) Inventor: Peter Schiff, 4900 Forrest Hill Rd., Cookeville, TN (US) 38506

( * ) Notice: Subject to any disclaimer, the term of this patent is extended or adjusted under 35 U.S.C. 154(b) by 161 days.

(21) Appl. No.: 11/134,765

(22) Filed: May 23, 2005

(51) Int. Cl.
*B60H 1/32* (2006.01)
*F25D 9/00* (2006.01)

(52) U.S. Cl. .......................................... 62/244; 62/401
(58) Field of Classification Search .................. 62/86, 62/87, 172, 401, 402, 406, 410
See application file for complete search history.

(56) References Cited

U.S. PATENT DOCUMENTS

| | | | | |
|---|---|---|---|---|
| 3,537,510 | A | 11/1970 | Rannenberg | 165/32 |
| 3,719,324 | A * | 3/1973 | Uheling et al. | 239/265.19 |
| 4,773,307 | A * | 9/1988 | Goodman | 454/73 |
| 6,058,715 | A * | 5/2000 | Strang et al. | 62/87 |
| 6,148,622 | A * | 11/2000 | Sanger | 62/88 |
| 6,381,969 | B1 * | 5/2002 | Afeiche et al. | 62/87 |
| 6,402,812 | B1 * | 6/2002 | Perrotta et al. | 95/95 |
| 6,427,471 | B1 * | 8/2002 | Ando et al. | 62/402 |
| 6,519,969 | B2 * | 2/2003 | Sauterleute | 62/401 |
| 6,637,215 | B1 * | 10/2003 | Leathers | 62/87 |
| 6,684,660 | B1 | 2/2004 | Bruno et al. | 64/402 |
| 6,848,261 | B2 * | 2/2005 | Claeys | 62/87 |
| 6,871,510 | B2 * | 3/2005 | Haas | 62/402 |
| 6,908,062 | B2 * | 6/2005 | Munoz et al. | 244/118.5 |
| 6,928,832 | B2 * | 8/2005 | Lents et al. | 62/401 |
| 7,171,819 | B2 * | 2/2007 | Lui et al. | 62/172 |
| 2003/0126880 | A1 * | 7/2003 | Zywiak | 62/402 |

FOREIGN PATENT DOCUMENTS

GB         2076897 A   * 12/1981

* cited by examiner

*Primary Examiner*—Mohammad M. Ali
(74) *Attorney, Agent, or Firm*—LaMorte & Associates

(57) ABSTRACT

An environmental control system for an aircraft having an air pump that is powered by bleed air from an engine of the aircraft. Although the air pump is powered by engine bleed air, the air pump draws ambient fresh air from outside the aircraft, compresses the fresh air to a predetermined pressure and pumps compressed fresh air into the pressurized cabin of the aircraft without ever exposing the fresh air to the compressed engine air. To heat the compressed fresh air, heat from the engine bleed air can be transferred to the compressed fresh air with a heat exchanger. However, although heat is exchanged between the engine bleed air and the compressed fresh air, the two flows of air are kept separate and are never mixed.

14 Claims, 6 Drawing Sheets

ENVIRONMENTAL CONTROL SYSTEM AND METHOD FOR AN AIRCRAFT

BACKGROUND OF THE INVENTION

1. Field of the Invention

In general, the present invention relates to environmental control units for aircraft that have pressurized cabins. More particularly, the present invention relates to environmental control units that utilize secondary turbines to compress air, wherein the secondary turbines are driven by the bleed air from an aircraft engine.

2. Prior Art Description

Low flying, relatively slow aircraft do not have to have sophisticated environmental controls for the inside of the aircraft cabin. The quality of the air within the aircraft cabin can be adjusted by simply opening and closing vents or windows. However, many modern aircraft are designed to fly at high altitudes and at high speeds. Such aircraft require pressurized cabins, where the pressure within the aircraft is artificially maintained. If an aircraft cabin is pressurized, fresh ambient air cannot simply be vented into the pressurized cabin from outside the aircraft. Rather fresh air must be compressed to a pressure that matches that of the interior of the pressurized cabin so that the fresh air will flow into the pressurized cabin.

Aircraft that are designed to fly at high altitudes typically have jet engines or turboprop engines. Such turbine engines have compressors that can compress air to pressures above one hundred pounds per square inch. As the air is compressed, it is heated and may achieve temperatures over five hundred degrees Fahrenheit at sea level. Fuel is then added to the compressed air and ignited in a separate combustion section of the aircraft engine.

Air can be bled from the compression chamber of the engine, prior to the compressed air becoming mixed with the fuel. By bleeding some air from the engine, a source of high temperature/high pressure air can be obtained. In early designs for aircraft environmental control systems, engine bleed air was directly used to feed air into a pressurized cabin. Such an environmental control system is exemplified by U.S. Pat. No. 3,537,510 to Rennenberg, entitled Pressure And Temperature Regulator For Aircraft Bleed Air System.

Since, engine bleed air is typically at a high pressure and at a high temperature, sophisticated heat exchangers and pressure regulators must be used to condition the bleed air so it is at the right temperature and pressure to be introduced into the cabin. Should a component fail, high temperature bleed air will directly flow into the pressurized cabin, thereby quickly overheating the cabin and requiring the aircraft to land for safety concerns and repairs.

Although engine bleed air can be used to directly heat the passenger cabin of an aircraft, the bleed air itself is never cooler than the cabin and cannot be used to cool the cabin. Rather, to cool the passenger cabin of an aircraft, the hot, high pressure bleed air is used to turn an expansion turbine. The turbine drives a compressor that is used to blow ambient air through a heat exchanger, thereby producing cooling. An additional function of the expansion turbine in such prior art systems is to remove energy from the bleed flow air after it has been cooled by a heat exchanger. This cools the bleed air flow to a temperature below that of the aircraft cabin. The cooled bleed air can then be used to cool the aircraft cabin. Such prior art systems, however, are complex and require sophisticated heat exchangers. These systems also use substantial volumes of bleed air from the aircraft engines. Furthermore, in many modern environmental control systems, it is the expansion turbine that has proven to be the least reliable component of the environmental control system and the most likely to fail.

In a variation of such a prior art cooling system, a turbine driven by engine bleed air can itself be used to turn a refrigerant compressor. Thus, the turbine can be used to directly power a refrigeration system. Such prior art air conditioning systems are exemplified by U.S. Pat. No. 6,684,660 to Bruno, entitled Pneumatic Cabin Super Charger. However, such prior art systems still suffer from the unreliability and short operational life of the turbines.

One problem associated with such prior art environmental control systems is that although the engine bleed air is used to run an air cooling system, the bleed air is also directly used to provide heat and cabin pressurization. Thus, if a component fails in the environmental control system, engine bleed air is directly fed into the passenger cabin and the passenger cabin quickly overheats.

Another problem associated with such prior art systems is that a large flow of engine bleed air is needed to drive the cooling system. Thus, the cooling system may work well when the aircraft is in flight and the engine is at cruise power. However, when the aircraft is taxiing on the ground and the engines are at idle, the cooling system works poorly.

Yet another problem associated with many prior art environmental control systems is that they require large volumes of bleed air from the engines. This results in direct power losses from the engines since it starves the engines of the high pressure air needed during combustion. Excess removal of bleed air from an engine also results in higher engine operating temperatures and increased maintenance requirements.

A need therefore exists for an improved environmental control system for an aircraft that can provide both heated air and cooled air into a pressurized cabin without ever directing engine bleed air into the cabin. In this manner, should the environmental control system ever fail, engine bleed air will not flow into the pressurized cabin and the pressurized cabin will not overheat.

A need also exists for an improved environmental control system that can work efficiently to cool the cabin when the aircraft is on the ground and the engines are at idle.

A need also exists for an environmental control system that can introduce more air into an aircraft cabin than is drained from the engines, thereby increasing engine efficiency and power when the environmental control system is in use.

These needs are met by the present invention as described and claimed below.

SUMMARY OF THE INVENTION

The present invention is an environmental control system for an aircraft that has a pressurized cabin. The environmental control system uses an air pump that is powered by bleed air from an engine of the aircraft. Although the air pump is powered by engine bleed air, the air pump draws ambient fresh air from outside the aircraft and pumps only compressed fresh air into the pressurized cabin of the aircraft.

The fresh air that is compressed by the air pump is slightly heated by the compression. To further heat the compressed fresh air, heat from the engine bleed air can be transferred to the compressed fresh air with a heat exchanger. However, although heat is exchanged between the engine bleed air and the compressed fresh air, the two flows of air are kept separate and are never mixed.

To cool the flow of compressed fresh air, heat from the compressed fresh air can be transferred to the ram air passing the aircraft with the use of a heat exchanger. If further cooling is required, the flow of compressed air can be cooled with an air conditioning unit. By using a refrigerant in a vapor cycle type of cooling, rather than cooling that relies upon an expansion turbine, a more efficient and reliable system is produced By heating and cooling the cabin of an aircraft with only compressed fresh air, the environmental control system cannot overheat or otherwise contaminate the air within the aircraft cabin should a malfunction occur. Furthermore, with the present invention environmental control system, low level heating can be obtained through the compression of air by the air pump. Low level cooling can be obtained by exchanging heat between the compressed air and ambient air. Thus, low level heating and cooling can be achieved with little or no extra power requirements. The result is an environmental control system that can both heat and cool in a highly efficient manner.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention environmental control system can be used on any aircraft that uses a jet engine or turboprop engine, the present invention system is best suited for use on smaller private planes, also known as general aviation aircraft, having pressurized cabins that seat no more than twelve people. With such a sized aircraft, a single system can be used to heat and cool the passenger cabin. The present invention environmental control system can be used on larger aircraft, however, various components would have to be supplied in multiples to meet the heating and cooling requirements of such aircraft. Such redundancies, however, add to the reliability of the overall system. By way of example, the present invention environmental control system is being shown applied to a smaller aircraft. In this manner, the simplest system can be illustrated and described. However, it will be understood that the embodiment is merely exemplary and should not be considered a limitation to the application of the system to other sized aircraft.

Figure 1:
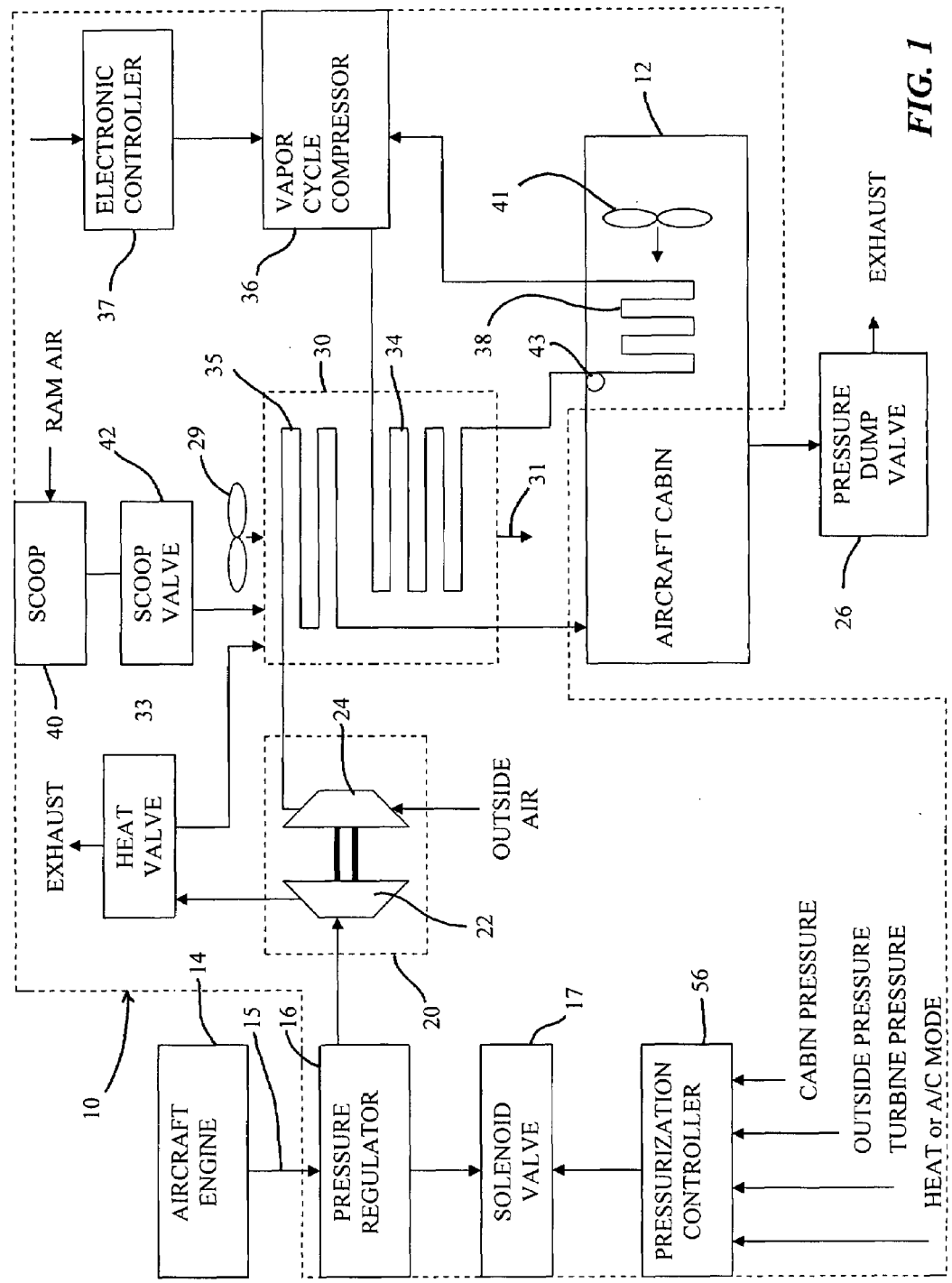
FIG. 1 is a schematic of an exemplary embodiment of the present invention environmental control system for an aircraft.

Referring to FIG. 1, there is a schematic of an exemplary embodiment of an environmental control system 10 as applied to an aircraft that has a pressurized cabin 12. The aircraft has at least one engine 14. The engine 14 can be either a jet engine or a turboprop engine, whereby the engine 14 has a turbine that compresses incoming air. As the engine 14 compresses air, the air is increased in both temperature and pressure. A volume of the high temperature/high pressure bleed air 15 from within the engine 14 is bled away for use by the environmental control system 10.

The bleed air 15 that is removed from the engine 14 is first passed through a pressure regulator 16. The pressure regulator 16 selectively varies the pressure of the bleed air 15 used by the environmental control system 10. The purpose of the pressure regulator 16 in the operation of the environmental control system 10 will later be described in more detail.

The bleed air 15 that passes out of the pressure regulator 16 is fed directly to an air pump assembly 20. The air pump assembly 20 is comprised of a turbine 22 and a compressor 24. The energy from the hot, high pressure bleed air 15 is used to turn the turbine 22. The spent bleed air that exits the turbine 22 is exhausted from the aircraft, in a manner later described. The bleed air 15 is never directed into the pressurized cabin 12. Consequently, should the air pump assembly 20 ever fail, the bleed 15 air would simply flow past the turbine 22 and be vented from the aircraft.

The compressor 24 receives ambient air from outside the aircraft. If the aircraft is in flight at a high altitude, the pressure of the ambient air received by the compressor 24 is less than the pressure maintained within the pressurized cabin 12. The compressor 24 compresses the ambient air to a pressure that matches, or slightly exceeds, the pressure within the pressurized cabin 12. In this manner, fresh air can be introduced into the pressurized cabin 12. The pressurized cabin 12 is vented with an aircraft pressurization dump valve 26 to maintain a preselected pressure within the pressurized cabin 12.

It will therefore be understood that the air pump assembly 20 interacts with two distinct and separate flows of air. The engine bleed air 15 is used to turn the turbine 22 and power the air pump assembly 20. Fresh air is compressed by the air pump assembly 20 and is introduced into the pressurized cabin 12. In this manner, engine bleed air 15 is never directly introduced into the pressurized cabin 12 and a malfunction of the air pump assembly 20 does not result in the bleed air 15 overheating the pressurized cabin 12.

Although the air pump assembly 20 allows fresh air to be continuously introduced into the pressurized cabin 12, it is often desirable to either heat or cool that incoming air to maintain a comfortable temperature within the pressurized cabin 12. A heat exchanger 30 is used to heat or cool the compressed air generated by the air pump assembly 20, prior to the compressed air entering the pressurized cabin 12. The compressor 24 compresses the fresh air to a pressure that is greater than the pressure of the aircraft cabin 12. The compression of the fresh air heats the compressed air. Consequently, the normal operation of the air pump assembly 20 will heat the air entering the aircraft cabin 12. However, if additional heat is needed within the aircraft cabin 12, the environmental control system 10 can be configured to operate in a heating mode.

When the environmental control system 10 is in its heating mode, some of the spent bleed air exiting the turbine 22 is directed through the housing of a heat exchanger 30. The spent bleed air is directed into the heat exchanger 30 depending upon the operating condition of a heat activation valve 33. The spent bleed air is still hot and heats the area surrounding a cabin coil 35. The air flowing from the air pump assembly 20 to the aircraft cabin 12 passes through the cabin coil 35 and is heated.

In addition, a vapor cycle refrigerant condenser coil 34 can also be present within the heat exchanger 30. The condenser coil 34 is coupled to an electric vapor cycle compressor 36 that is controlled by an electronic controller 37. Refrigerant compressed by the vapor cycle compressor 36 cools the refrigerant expansion coil 38 in the aircraft cabin 12. A blower 41 circulates air through the expansion coil 38, thereby cooling the aircraft cabin 12. A vapor cycle expansion valve 43 can be used to control the flow of refrigerant through the refrigerant expansion coil 38.

If it is desired to cool the aircraft cabin 12 while the aircraft is on the ground and there is no ram air flow through the heat exchanger 30, then a blower 29 is activated that blows ambient air over the air conditioning condenser coil 34. The blower 29 can be activated by a vane switch within the scoop 40 that detects when there is no ram air flow.

The electronic controller 37 controls the electrical vapor cycle compressor 36. The electronic controller 37 is a variable electric current driver for the vapor cycle compressor 36. The electronic controller 37 starts the vapor cycle compressor 36 at a very low speed and gradually increases the compressor speed, by slowly increasing current flow to the vapor cycle compressor 36. The variable current flow eliminates the occurrence of high current spikes that are common in prior art systems. Thus, current surges that are detrimental to many electronic components of the aircraft can be eliminated.

Furthermore, the electronic controller 37 slows the vapor cycle compressor 36 from a high speed operation to a slower speed whenever the evaporator coil 38 in the cabin 12 is cooled to a predetermined temperature. By slowing the vapor cycle compressor 36, rather than stopping it, current surges can be avoided while making the overall system more efficient.

The heat exchanger 30 is also exposed to the flow of air from a ram scoop 40. At cruising altitudes, the ambient ram air surrounding an aircraft is usually much cooler than the temperature within the cabin 12. By passing fresh air into the heat exchanger 30, the compressed air flowing into the aircraft cabin 12 can be selectively cooled.

The flow of ram air into the heat exchanger 30 is controlled by a scoop valve 42. When the scoop valve 42 is open, air is allowed to flow into the heat exchanger 30. When the scoop valve 42 is closed, the heat exchanger 30 is isolated. The scoop valve 42 is opened to cool the air flowing from the compressor 24 through the cabin coil 35 when the environmental control system 10 is in a cooling mode and is trying to cool the aircraft cabin 12.

The scoop valve 42 is closed when the environmental control system 10 is operating in its heating mode and is trying to heat the aircraft cabin 12.

Figure 2:
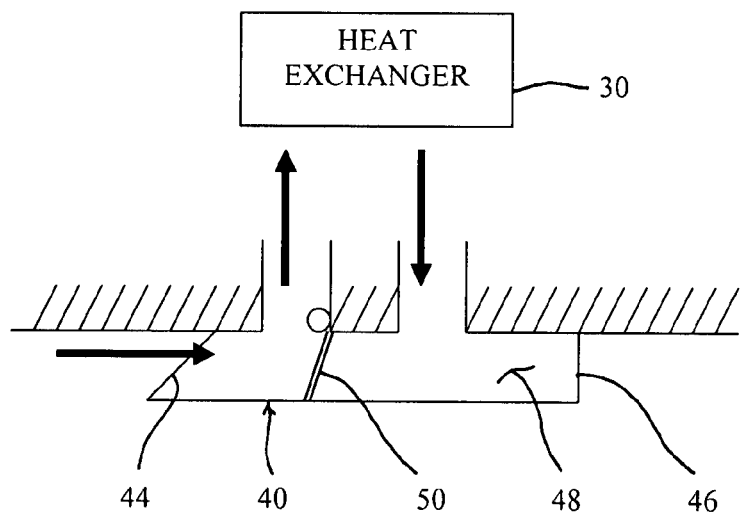
FIG. 2 is a cross-sectional view of an air ram scoop that is configured for use with the environmental control system when the environmental control system is operating in a cooling mode.

Referring now to FIG. 2, an embodiment of the ram scoop 40 and scoop valve 42 are shown. The ram scoop 40 is attached to the bottom of the aircraft. The ram scoop 40 has in input port 44 and an output port 46. The input port 44 faces the direction of flight so that ram air flows into the input port 44 when the aircraft is flying. The input port 44 and the output port 46 are at opposite ends of a common conduit 48. A scoop valve 42 is present within the conduit 48. The scoop valve 42 is a flap baffle 50 that can be used to selectively alter the path of flowing air. When the environmental control system is in its cooling mode, the flap baffle 50 obstructs the conduit 48 and diverts air entering the ram input port 44 up into the heat exchanger 30. After interacting with the heat exchanger 30, the air is directed back to the conduit 48 and out the output port 46.

Figure 3:
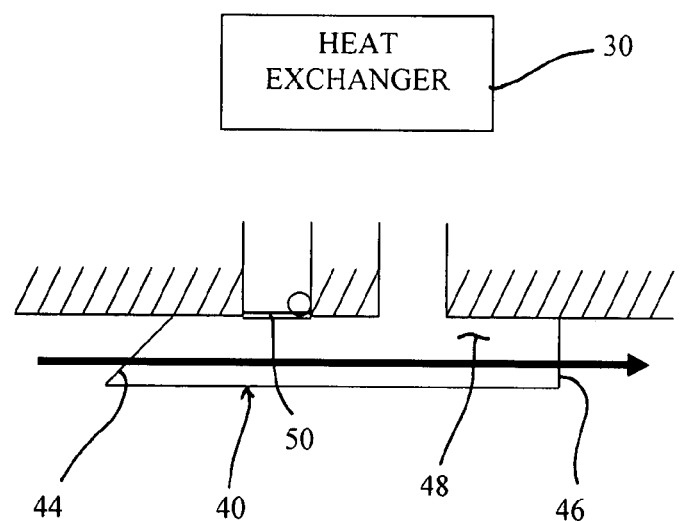
FIG. 3 is a cross-sectional view of an air scoop that is configured for use with the environmental control system when the environmental control system is operating in a heating mode.

Referring to FIG. 3, it can be seen that when the environmental control system is in its heating mode, the flap baffle 50 closes and the air entering the input port 44 of the ram scoop 40 flows through the conduit 48 and directly out the output port 46 without effecting the heat exchanger 30 or increasing aerodynamic drag.

Returning to FIG. 1, it can be seen that a pressure regulator 16 is coupled to a pressurization controller 56. The purpose of the pressurization controller 56 is to regulate the pressure regulator 16 and the flow of bleed air to optimize the performance of the environmental control system 10 in both its heating mode and cooling mode. The pressurization controller 56 reduces the pressure and flow of bleed air 15 reaching the air pump assembly 20 when the aircraft is flying at low altitudes and the pressure differential between the aircraft cabin 12 and the surrounding environment is low. The pressurization controller 56 achieves this function by activating a solenoid valve 17 that controls the pressure regulator 16, as will later be described in more detail. A reduced flow of bleed air means less power is being supplied to the air pump assembly 20 and less air is compressed and pumped into the aircraft cabin 12. The pressurization controller 56 is coupled to sensors that monitor the cabin pressure, outside air pressure and bleed air pressure at the turbine 22. The pressure controller function is also determined by selecting the heat or cooling mode of the system. As the aircraft climbs in altitude and the pressurization differential increases, the pressurization controller 56 increases the bleed air flow to the air pump assembly 20 to keep the cabin pressure just slightly ahead of what is needed by the cabin 12.

The pressurization controller 56 has the added function of reducing the pressurization bump that occurs when the bleed air pump assembly 20 is turned on after the aircraft has reached a significant altitude and a large pressure differential exists between the cabin 12 and outside air. The pressurization controller 56 can slowly increase the flow of bleed air, thereby slowly increasing the power provided to the air pump assembly 20. The air pump assembly 20 can therefore be brought up to the appropriate operating speed without any rapid drain of bleed air from the engines or any sudden activation of the air pump assembly 20 from a dead stop.

The pressurization controller 56 also allows the bleed air flow to be turned on or off when the aircraft operates below 5000 feet. When the aircraft descends to a low altitude, there is little or no pressure differential between the aircraft cabin 12 and the surrounding air. As a consequence, air does not have to be compressed prior to being introduced into the aircraft cabin 12. By automatically deactivating the air pump assembly 20, there is no further compression and heating of air by the air pump assembly 20. The cabin 12 can therefore be cooled more efficiently.

Figure 4:
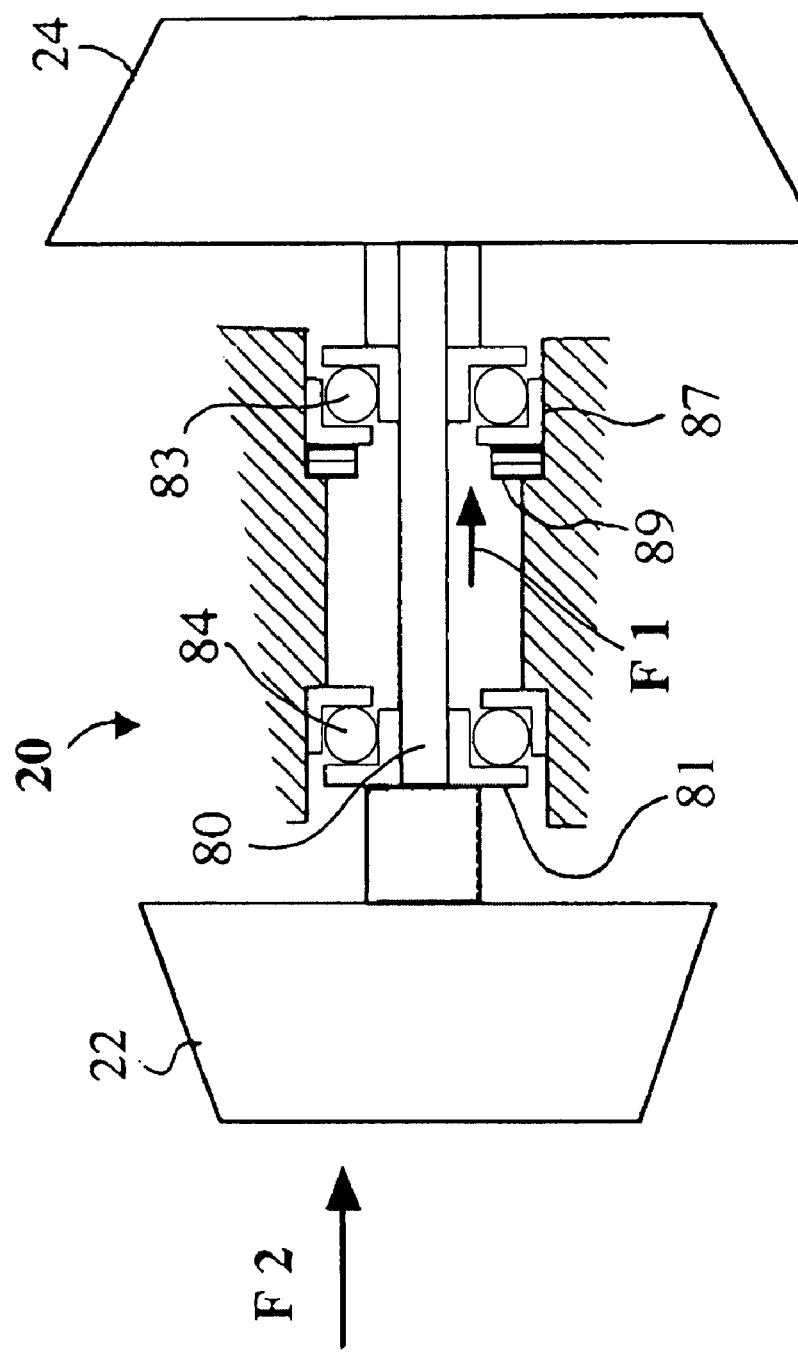
FIG. 4 shows an exemplary embodiment of the bearing components in the air pump assembly.

Referring now to FIG. 4, the structure of the air pump assembly 20 can now be described in more detail. From FIG. 4, it can be seen that the air pump assembly 20 has a turbine 22 and a compressor 24 that are joined by a common shaft 80. The shaft 80 is held in place by two sets of ball bearings 83, 84. Both sets of ball bearings 83, 84 preferably contain ceramic ball bearings that enable the shaft 80 to spin in excess of 100,000 revolutions per minute. An axial load is maintained on both sets of ball bearings 83, 84 to keep them running smoothly at high speeds. Each set of ball bearings 83, 84 are held between an inner race 81 and an outer race 87. The axial load is provided by springs 89. The springs 89 bias the outer race 87 of at least one set of ball bearings 83, against that set of ball bearings. The springs 89 therefore provide a preload bias force F1 that acts in a first direction and preloads both sets of ball bearings 83, 84.

When bleed air interacts with the turbine 22, a dynamic axial force F2 is experienced by the shaft 80. It is preferred that the preload bias force F1 act in the same direction as the dynamic axial force F2 experienced by the shaft 80. If the preload bias force F1 were reversed in direction, so that the dynamic axial force F2 were opposed by the preload bias force, then the preload bias force would have to be made large enough to exceed the dynamic axial force F2. This would result in excessive preload forces at low turbine pressures. This would result in excess heating of the sets of ball bearings 83, 84 and the shaft 80, thereby shortening the operating life of these components.

It is therefore preferred that the preload bias force F1 act in the same direction as the dynamic axial force F2. In this manner, only a nominal preload bias force F1 is needed. This reduces friction losses, heat generation and greatly increases the reliability of the air pump assembly 20.

Figure 5:
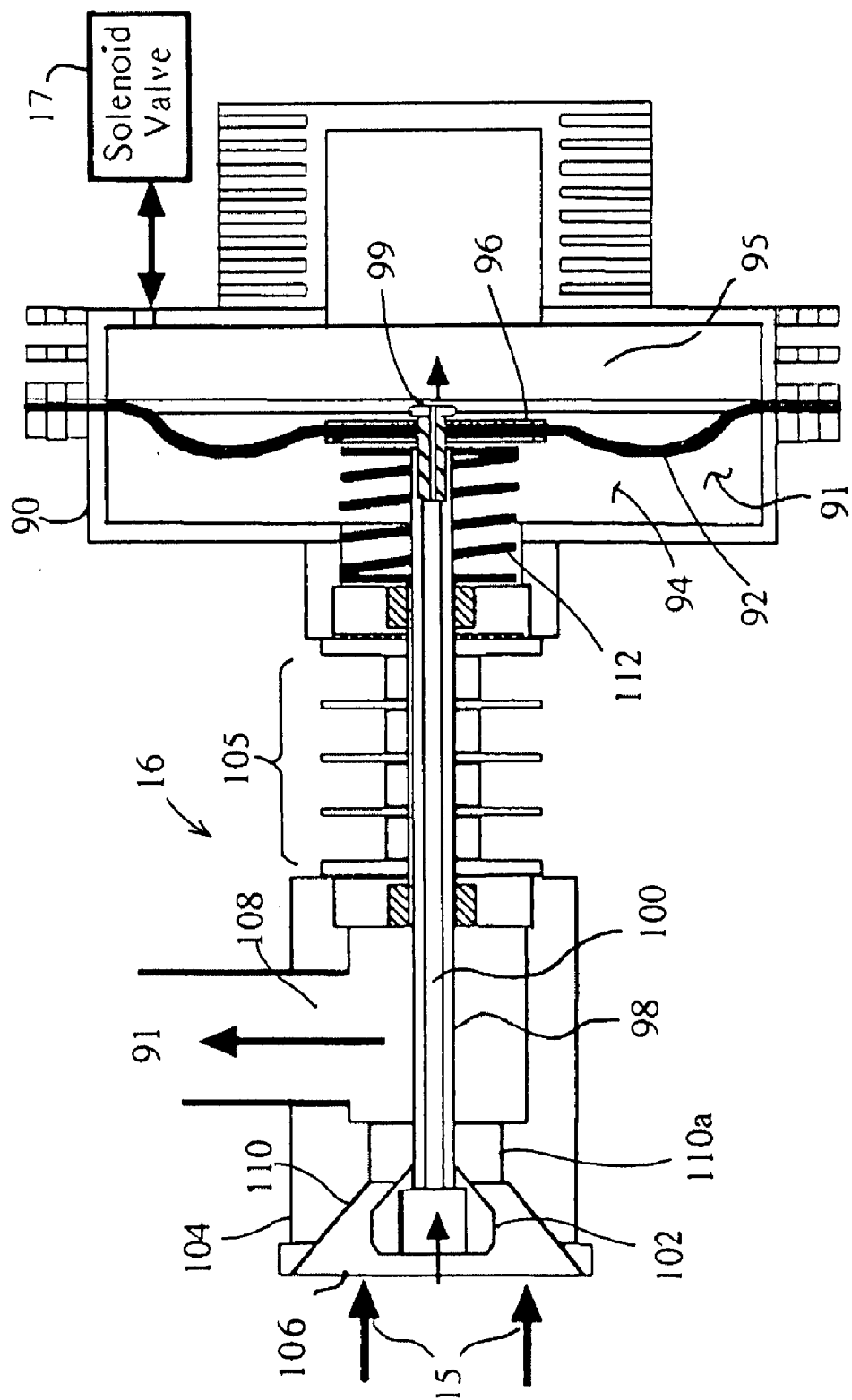
FIG. 5 is a cross-sectional view of an exemplary embodiment of a bleed air pressure regulator.

In FIG. 1, a pressure regulator 16 is shown regulating the bleed air 15 being received by the turbine 22 in the air pump assembly 20. The pressure regulator 16 is used to increase the flow rate of bleed air 15 to the turbine 22 as the aircraft climbs to high altitude. Referring now to FIG. 5, the structure of the pressure regulator 16 can now be described in more detail. The pressure regulator 16 has diaphragm housing 90 that defines a diaphragm chamber 91. Within the diaphragm chamber 91 is a diaphragm 92 that divides the diaphragm chamber 91 into a front section 94 and a rear section 95. An annular hub 96 is disposed on the center of the diaphragm 92. The diaphragm housing 90 preferably has fins on its exterior to help dissipate heat.

A valve plunger 98 is provided. The valve plunger 98 has a tubular valve stem 100 and an enlarged valve head 102. The tubular valve stem 100 extends into the center of the annular hub 96 on the diaphragm 92.

A valve housing 104 is provided that attaches to the diaphragm housing 90 via a spacer section 105. The spacer section 105 may also have fins to dissipate heat. The valve plunger 98 extends into a valve housing 104 through the spacer section 105. The valve housing 104 has an inlet port 106 that receives the bleed air 15 from the engine, and an output port 108 that leads to the turbine 22 (FIG. 1). The valve housing 102 has a shaped valve seat 110 that interacts with the valve head 102 of the valve plunger 98. The amount of bleed air 15 that is permitted to flow from the input port 106 to the output port 108 is controlled by the position of the valve head 102 relative to the valve seat 110. If the valve head 102 is within the valve seat 110 all or most of the air flow is stopped. As the valve head 102 moves away from the valve seat 110, the flow of bleed air increases proportionally.

The valve plunger 98 is not seated with air tight bearings. Accordingly, bleed air 15 from within the valve housing 104 is able to flow around the valve plunger into the front section 94 of the diaphragm chamber 91. The air pressure within the front section 94 of the diaphragm chamber 91 is therefore equal to the pressure within the valve housing 104, wherein this pressure is also equal to the pressure of the bleed air being sent to the turbine 22 (FIG. 1).

As bleed air 15 flows into the input port 106 some of the bleed air 15 flows through the structure of the valve plunger 98 and is received within the rear section 95 of the diaphragm chamber 91. A restrictor 99 is present at the end of the valve plunger 98 to limit the flow of the bleed air 15. This increases the pressure within the rear section 95 of the diaphragm chamber 95, thereby acting to deform the diaphragm 92 and increase the volume of the rear section 95.

The deformation of the diaphragm 92 is resisted both by a spring 112 and the air pressure within the front section 94 of the diaphragm chamber 91. The spring 112 provides a predetermined biasing force. It will therefore be understood that the air pressure in the rear section 95 of the diaphragm chamber 91 must reach some threshold pressure differential, relative the front section 94, before the diaphragm 92 will move against the bias of the spring 112.

The spring 112 presses on the annular hub 96 and biases the valve head 102 against the valve seat barrel 110A, thereby stopping air flow through the pressure regulator 16. It will therefore be understood that when the bleed air pressure reaching the turbine 22 is low, the pressure in the rear section 95 of the diaphragm chamber 90 will be low and the diagram will not move against the bias of the spring 112. The valve head 102 will therefore sit in a closed position within the valve seat barrel 110A. However, as the bleed air pressure increases, the pressure in the rear section 95 of the diaphragm chamber 91 will increase. A pressure differential will then develop between the rear section 95 of the diaphragm chamber 91 and front section 94 of the diaphragm chamber 91. At some predetermined pressure differential, the diaphragm 92 will move against the bias of the spring 112 and the valve head 102 will move away from the valve seat 110.

The pressure within the rear section 95 of the diaphragm chamber 91 is selectively controlled by the solenoid valve 17. When the solenoid valve 17 is open, the pressure within the rear section 95 of the diaphragm chamber 91 is vented to ambient. When the solenoid valve 17 is closed, the pressure builds to match the pressure of the incoming bleed air 15. Thus, by opening and closing the solenoid valve 17, the diaphragm 92 can be caused to move in either direction, thereby controlling the flow of bleed air 15 through the valve housing 104 and into turbine 22 (FIG. 1).

Figure 6:
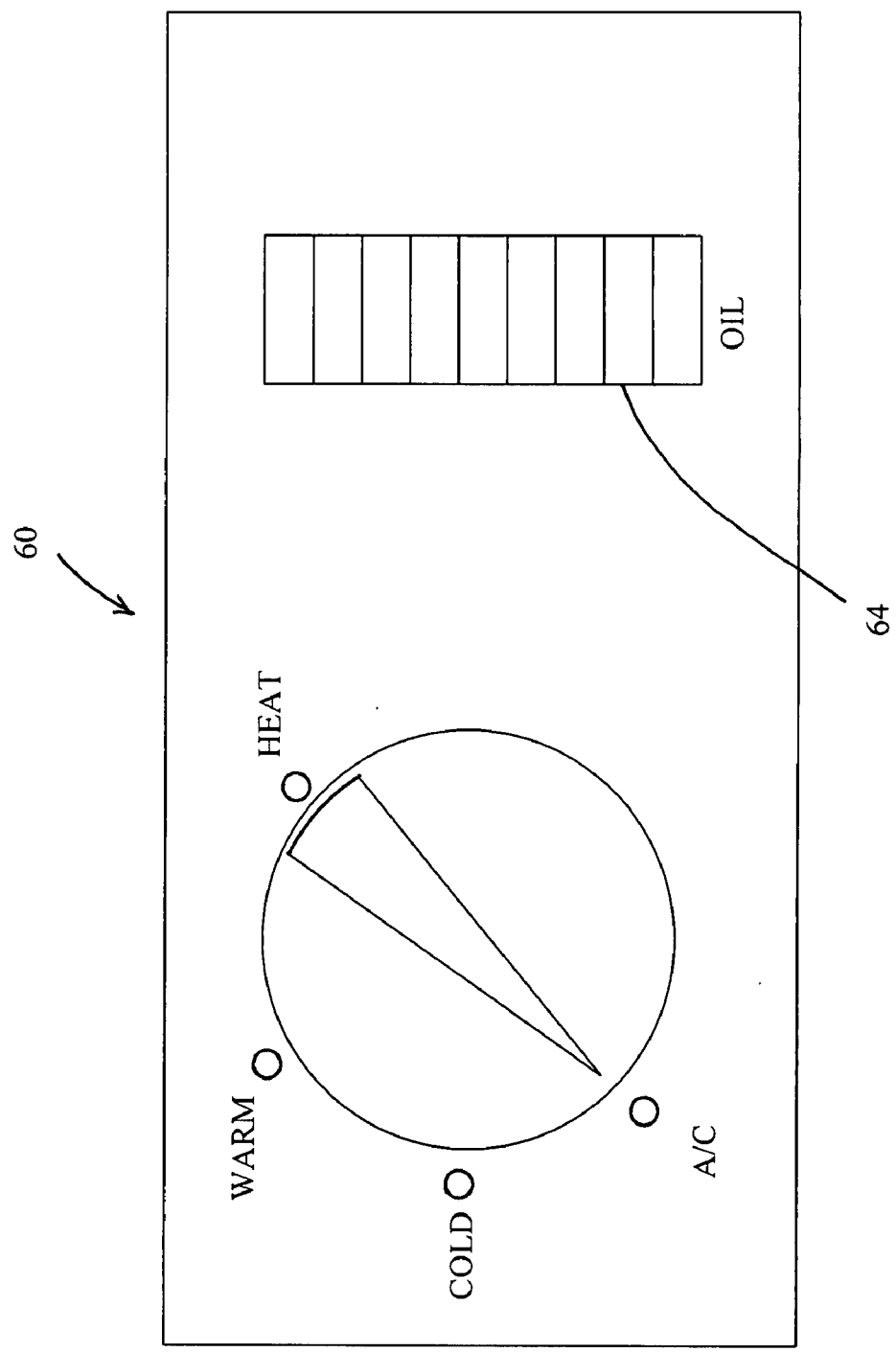
FIG. 6 is an exemplary embodiment of a control panel for the environmental control system.

The selection of a heating mode for the aircraft cabin or a cooling mode for the aircraft cabin is made when the pilot manipulates a control panel in the cockpit. Referring to FIG. 6, an exemplary embodiment of a control panel 60 is shown. The control panel 60 has an environmental control selector 62 with four options. The four options are "Heat", "Warm", "Cool" and "A/C". Referring to FIG. 6 in conjunction with FIG. 1, it will be understood that when a pilot selects the "warm" setting, the air pump assembly 20 is activated. The air pump assembly 20 compresses air that is entering the cabin 12 and therefore warms the air that is entering the cabin 12. When a pilot selects the "heat" setting, the heat activation valve 33 is opened and additional heat is added to the air entering the cabin 12 through the heat exchanger 30. When the "cool" setting is selected, the scoop valve 42 is opened, the heat activation valve 33 closes and air entering the ram scoop 40 is used to cool the air flowing into the cabin 12. Lastly, when the "A/C" setting is selected, the cabin 12 is further cooled using the flow of a compressed refrigerant into the refrigerant expansion coil 38.

Figure 7:
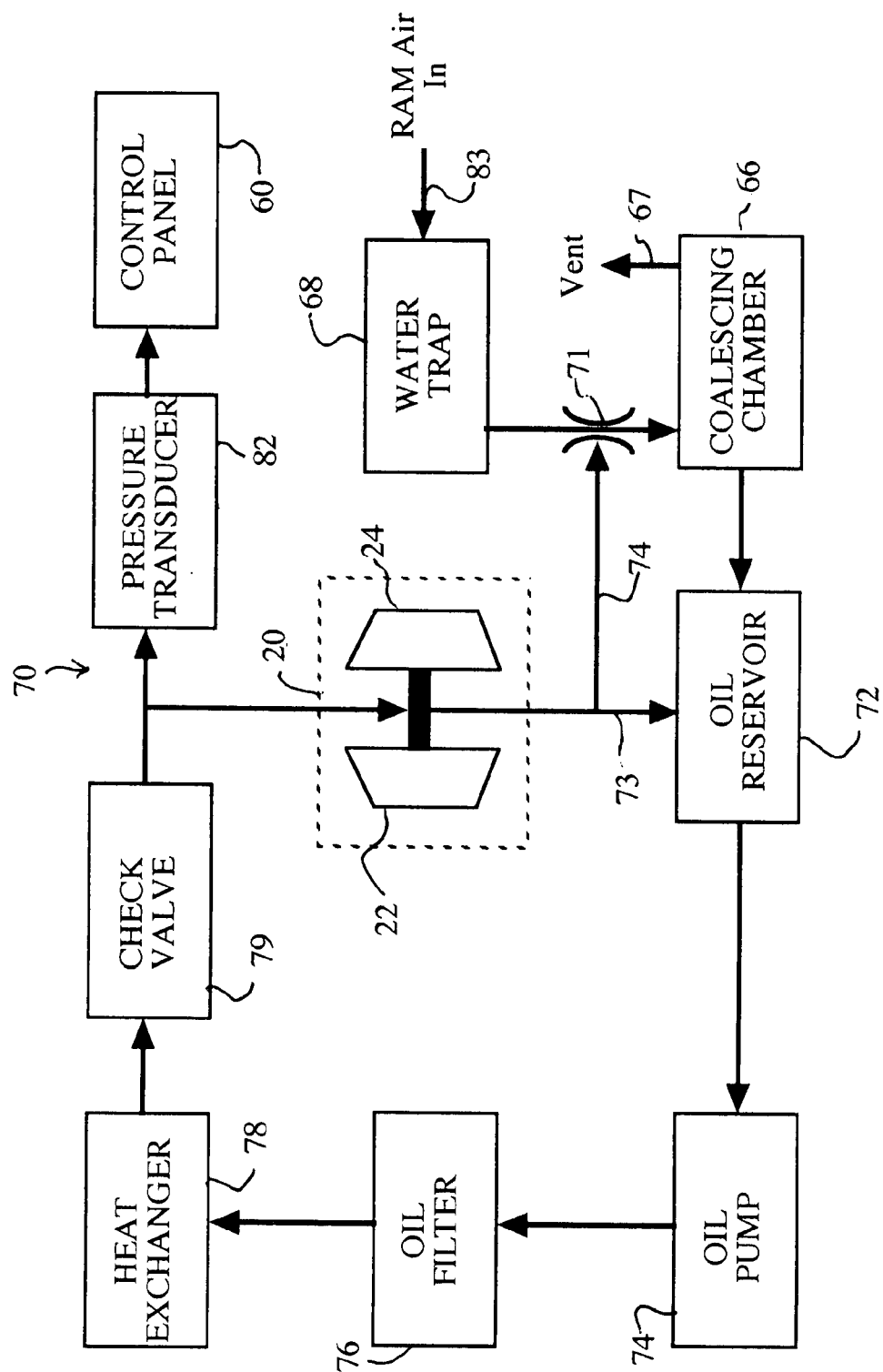
FIG. 7 is a schematic showing the lubrication system for the air pump.

Also present on the control panel 60 is an oil pressure indicator 64. The oil pressure indicator 64 provides the pilot with a visual indication as to the flow of lubricant to the air pump assembly 20. The air pump assembly 20 has a unique lubrication system that is essential for its operation. Referring to FIG. 7, the lubrication system 70 for the air pump assembly 20 is shown. The lubrication system 70 has an oil reservoir 72 that holds a predetermined volume of oil. An oil pump 74 is used to draw oil from the reservoir and circulate the oil throughout the lubrication system 70. The oil passes through an oil filter 76 to remove internal contaminants. The oil is also fed through a heat exchanger 78 that keeps the oil cool and prevents the oil from breaking down or otherwise being damaged by heat. A check valve 79 is provided to ensure the oil only flows in the proper direction. An oil pressure transducer 82 is provided that monitors the pressure of the oil in the lubrication system 70 and provides a signal to the control panel 60.

The oil lubricates the bearings within the air pump assembly 20. However, due to the high speed of rotation, liquid oil and an oil mist aerosol exits the air pump assembly 20. The oil mist cannot be directly fed back into the oil reservoir 72 because it would be vented before it could return to a liquid state. This would result in substantial oil loss from the system and requires oil to be replaced on a regular basis. In addition, the loss is substantial enough that it would contaminate the external surfaces of the aircraft. Separating the oil from the oil mist is a difficult problem that cannot be addressed by traditional oil filters or centrifugal spinners. Instead, oil separation is achieved in the present invention system by using a venturi and a coalescing chamber.

From FIG. 7, it can be seen that liquid oil 73 exiting the air pump assembly 22 is directed back to an oil reservoir 72. The oil mist 74 is directed to a venturi 71 and into a vented coalescing chamber 66 that allows the oil mist to coalesce back into a flowing liquid. The coalescing chamber 66 has an air vent 67 that is routed to an exhaust duct in the aircraft. Fresh air is fed into the coalescing chamber 67 from an existing ram air scoop on the aircraft, such as the battery vent inlet scoop. Since fresh air is being used to help coalesce the oil mist in the venturi 71 and oil coalescing chamber 66, a water trap 68 is provided to remove excess water vapor from the incoming air. In this manner, water is not mixed with the oil, should the aircraft be flying through a cloud or in wet weather.

Air exiting the water trap 68 passes through the venturi 71 and draws the oil mist toward the coalescing chamber 66. By drawing the oil mist through the venturi 71, the oil mist can be greatly cooled. The agitation of the oil mist that is caused by the venturi 71 makes the oil easier to recover in the coalescing chamber 66.

In summary, the present invention environmental control system allows engine bleed air to power an air pump. The air pump compresses fresh air and feeds that air into a pressurized aircraft cabin compartment. The compressed fresh air being pumped into the pressurized cabin can then be either heated or cooled to produce a desired temperature within the aircraft cabin. By using engine bleed air only to power the air pump assembly, the bleed air never enters the aircraft cabin and cannot overheat the aircraft cabin if the air pump assembly fails.

The present invention environmental control system therefore provides a safer and more energy efficient way to condition the environment of a pressurized aircraft cabin. This is because the volume of ambient air being pumped into the cabin is greater then the volume of bleed air taken from the engine.

It will be understood that the embodiment of the present invention that is described and illustrated is merely exemplary and that a person skilled in the art can make many variations to the shown embodiment using functionally equivalent components and configurations. For instance, in the embodiment of FIG. 1, bleed air is fed into the heat exchanger after the bleed air has passed through the air pump assembly. Some bleed air can be directed through the heat exchanger before it has been used by the air pump assembly. All such alternate embodiments, modifications and variations are intended to be included within the scope of the present invention, as defined by the claims.

What is claimed is:

1. In an aircraft having a pressurized cabin and an engine that produces compressed engine air, an environmental control system for the aircraft having at least one heating mode, said environmental control system comprising:
   an air pump powered by the compressed engine air, wherein said air pump draws ambient fresh air from outside the aircraft, compresses the fresh air to a predetermined pressure and pumps compressed fresh air into the pressurized cabin of the aircraft without ever exposing the fresh air to the compressed engine air; and
   a heat exchanger that receives the compressed engine air and transfers heat from the compressed engine air to said compressed fresh air when said environmental control system is in said at least one heating mode.

2. The system according to claim 1, wherein said environmental control system also operates in at least one cooling mode, wherein said environmental control system cools said compressed fresh air when operating in said at least one cooling mode.

3. The system according to claim 1, wherein said heat exchanger receives ambient air from outside the aircraft and transfers heat from said compressed fresh air to said ambient air when said environmental control system is in said at least one cooling mode.

4. The system according to claim 1, further including an air ram for directing ambient air into said heat exchanger when said environmental control system is in said at least one cooling mode.

5. The system according to claim 4, further including a valve for selectively preventing ambient air from said air ram from reaching said heat exchanger when said environmental control system is in said at least one heating mode.

6. The system according to claim 1, wherein said air pump has a turbine that is powered by said compressed engine air and an air compressor that is powered by said turbine.

7. The system according to claim 6, wherein a shaft connects said turbine to said air compressor, wherein said shaft is supported by bearings that are preloaded in a first direction.

8. The system according to claim 7, wherein compressed engine air applies a dynamic force to said shaft when interacting with said turbine, wherein said dynamic force acts on said shaft in a direction common with first direction of the preloading of said bearings.

9. The system according to claim 1, further including a lubrication arrangement for said air pump that supplies oil to said air pump, wherein said lubrication arrangement includes an oil reservoir and an oil pump.

10. The system according to claim 9, wherein said lubrication arrangement further includes a coalescent chamber that enables said oil to coalesce.

11. The system according to claim 10, wherein said coalescent chamber is vented and receives a flow of fresh air from outside the aircraft, and wherein said oil is drawn through a venturi into said coalescent chamber by said flow of fresh air.

12. The system according to claim 1, further including a pressure regulator for regulating said compressed engine air used to power said air pump.

13. The system according to claim 12, further including an automated controller for selectively controlling said pressure regulator.

14. In an aircraft having a pressurized cabin and an engine that produces compressed engine air, an environmental control system for the aircraft, said environmental control system comprising:

an air pump powered by the compressed engine air, wherein said air pump draws ambient fresh air from outside the aircraft, compresses the fresh air to a predetermined pressure and pumps compressed fresh air into the pressurized cabin of the aircraft without ever exposing the fresh air to the compressed engine air;

a pressure regulator for regulating said compressed engine air used to power said air pump; and an automated controller for selectively controlling said pressure regulator.

* * * * *